United States Patent
Sutivong et al.

(10) Patent No.: US 8,160,046 B2
(45) Date of Patent: Apr. 17, 2012

(54) CONTROL CHANNEL ASSIGNMENT IN A WIRELESS COMMUNICATION NETWORK

(75) Inventors: Arak Sutivong, San Diego, CA (US); Sony John Akkarakaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 962 days.

(21) Appl. No.: 11/021,695

(22) Filed: Dec. 22, 2004

(65) Prior Publication Data

US 2006/0133262 A1   Jun. 22, 2006

(51) Int. Cl.
*H04B 7/208* (2006.01)

(52) U.S. Cl. .......... 370/344; 370/343

(58) Field of Classification Search ....... 455/450–452.1; 370/330, 335–336, 343–344
See application file for complete search history.

(56) References Cited

U.S. PATENT DOCUMENTS

| | | | |
|---|---|---|---|
| 6,421,357 B1 * | 7/2002 | Hall | 370/479 |
| 6,522,625 B1 * | 2/2003 | Hayashi et al. | 370/208 |
| 2003/0072296 A1 * | 4/2003 | Odenwalder et al. | 370/349 |
| 2004/0001429 A1 | 1/2004 | Ma et al. | |
| 2004/0081131 A1 | 4/2004 | Walton et al. | |
| 2004/0264507 A1 * | 12/2004 | Cho et al. | 370/480 |
| 2005/0063331 A1 * | 3/2005 | Kim et al. | 370/328 |
| 2006/0146867 A1 * | 7/2006 | Lee et al. | 370/465 |
| 2006/0203707 A1 * | 9/2006 | Lee et al. | 370/208 |

FOREIGN PATENT DOCUMENTS

| | | |
|---|---|---|
| RU | 95121152 | 12/1997 |
| RU | 2149518 | 5/2000 |

OTHER PUBLICATIONS

International Search Report—PCT/US2005/046737, International Search Authority—European Patent Office—Apr. 25, 2006.
Written Opinion—PCT/US2005/046737, International Search Authority—European Patent Office—Apr. 25, 2006.

* cited by examiner

*Primary Examiner* — Steven Lim
(74) *Attorney, Agent, or Firm* — Kenneth Vu (57) ABSTRACT

The disclosed embodiments provide for methods and systems for allocating a plurality of users on a control channel in a wireless communication network. In one aspect, a method for allocating a plurality of users on a control channel includes assigning a first number of modulation symbols to a hop region for a control channel, and allocating a second number of users to the first number of modulation symbols.

91 Claims, 4 Drawing Sheets

CONTROL CHANNEL ASSIGNMENT IN A WIRELESS COMMUNICATION NETWORK

BACKGROUND

I. Field

The present invention relates generally to communication, and more specifically to methods and apparatus for efficient control channel assignment in a wireless communication system.

II. Background

Communication systems are widely deployed to provide various communication services such as voice, packet data, and so on. These systems may be time, frequency, and/or code division multiple-access systems capable of supporting communication with multiple users simultaneously by sharing the available system resources. Examples of such multiple-access systems include Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

There is therefore a need in the art for methods and apparatus for efficient control channel assignment in a wireless communication system.

SUMMARY

The disclosed embodiments provide for methods and systems for allocating a plurality of users on a control channel in a wireless communication network. In one aspect, a method for allocating a plurality of users on a control channel includes assigning a first number of modulation symbols to a hop region for a control channel, and allocating a second number of users to the first number of modulation symbols.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean"serving as an example, instance, or illustration." Any embodiment or design described herein is"exemplary" and is not necessarily to be construed as preferred or advantageous over other embodiments or designs.

An "access terminal" refers to a device providing voice and/or data connectivity to a user. An access terminal may be connected to a computing device such as a laptop computer or desktop computer, or it may be a self contained device such as a personal digital assistant. An access terminal can also be called a subscriber unit, mobile station, mobile, remote station, remote terminal, user terminal, user agent, or user equipment. An access terminal may be a subscriber station, wireless device, cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem.

An "access point" refers to a device in an access network that communicates over the air-interface, through one or more sectors, with the access terminals. The access point acts as a router between the access terminal and the rest of the access network, which may include an IP network, by converting received air-interface frames to IP packets. Access point also coordinates the management of attributes for the air interface.

The disclosed embodiments provide for efficient designs for the control channel in a wireless communication system, e.g., an OFDMA system. The control channel facilitates communication between the access terminal (AT) and the access point (AP), e.g., a reverse link (RL) may be used to carry: a) requests for forward-link resources (e.g., REQ), b) forward-link channel quality indicators (e.g., CQI), and c) acknowledgements (e.g., ACK/NACKs), telling the access point whether or not the access terminal has received the data sent on the forward link, i.e., enabling Hybrid ARQ. Control channels have generally low data rates and payload bandwidth compared to data channels.

In one embodiment, e.g., in a frequency-hopping (FH-OFDMA), a channel may be defined by groups of M subcarriers or tones that hop together once every N modulation symbols. Thus, in the time-frequency plane, a hop region corresponds to a rectangular N×M grid of modulation symbols. The values of M and N may be chosen so that the channel is almost constant over the hop, allowing the channel to be estimated based on pilot symbols inserted in the hop region. The channels may be defined by one or more of such hop regions, which may be assigned to physical sub-carriers by a hop-permutation of periodicity N.

In one embodiment, control channels may have the same structure as the data channels. A single control channel may, however, have capacity to handle control transmissions for multiple users, so the control channel may be shared among multiple users. In one embodiment, each modulation symbol is repeated P times with a P-ary Walsh (or exponential) code overlay. Thus, P different use's can share the same channel, each sending (M*N)/P modulation symbols each with P-ary repetition. In this case, multiple users may be distinguished by their unique Walsh codes. The Walsh-repeated symbols may be placed close to each other in time and frequency so that they see approximately the same propagation channel, and hence, different users remain orthogonal. The modulation symbols may be generated by some symbol-mapping of the control information bits.

Figure 1:
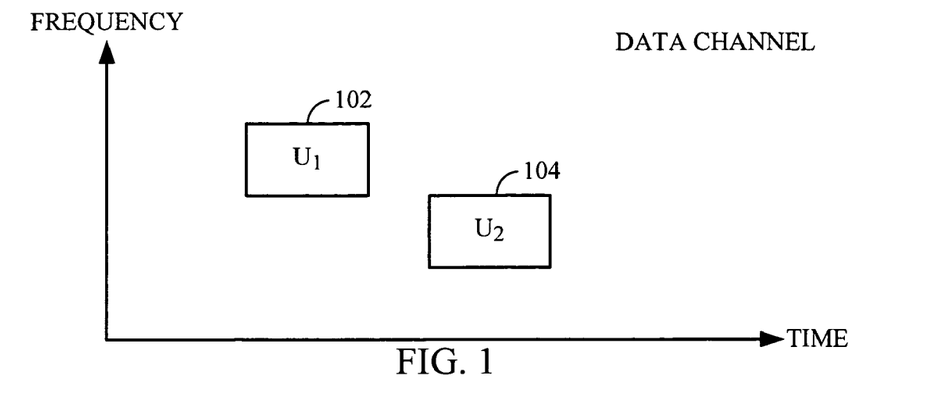
FIG. 1 shows one embodiment for data channel assignment in a communication network.

FIG. 1 shows one embodiment for data channel assignment in a communication network, e.g., in a FH-OFDMA. A plurality of users may be allocated on one or more data channels in a wireless communication network. In one embodiment, for a data channel, hop regions 102 and 104 are assigned to users U1 and U2, respectively. Users U1 and U2 may transmit data on modulation symbols (sub-carriers) within their respective hop regions for a data channel. In one embodiment, more than one hop region may be assigned to a single user.

Figure 2A:
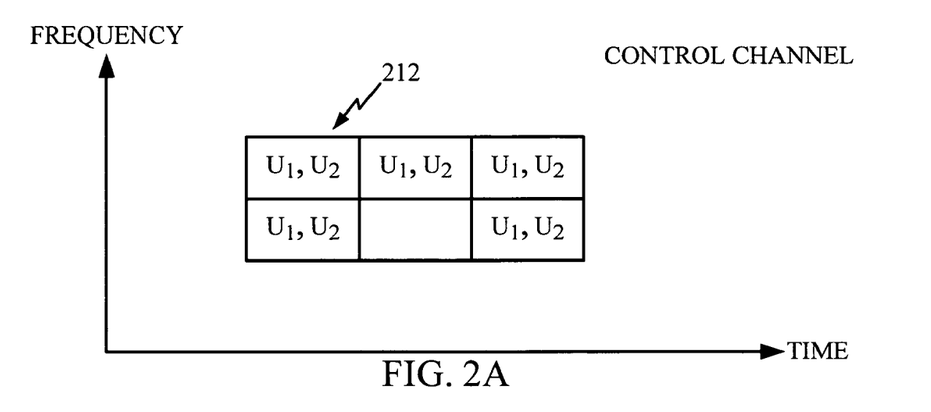
FIG. 2A shows one embodiment for assigning multiple users on the same control channel in a communication network.

In a first embodiment for a control channel assignment, as shown in FIG. 2A, a hop region 212 is jointly assigned to two or more users, e.g., U1 and U2. Users U1 and U2 may jointly transmit control information on the modulation symbols within the hop region 212 for a control channel. In one embodiment, each of a plurality of the users assigned to the same hop region is assigned a unique Walsh code, so that such users may be distinguished from each other. When all users transmit on all modulation symbols within the hop, this embodiment provides for uniform interference to other sectors over the hop region, which helps in reverse-link interference estimation for the purpose of data demodulation.

Figure 2B:
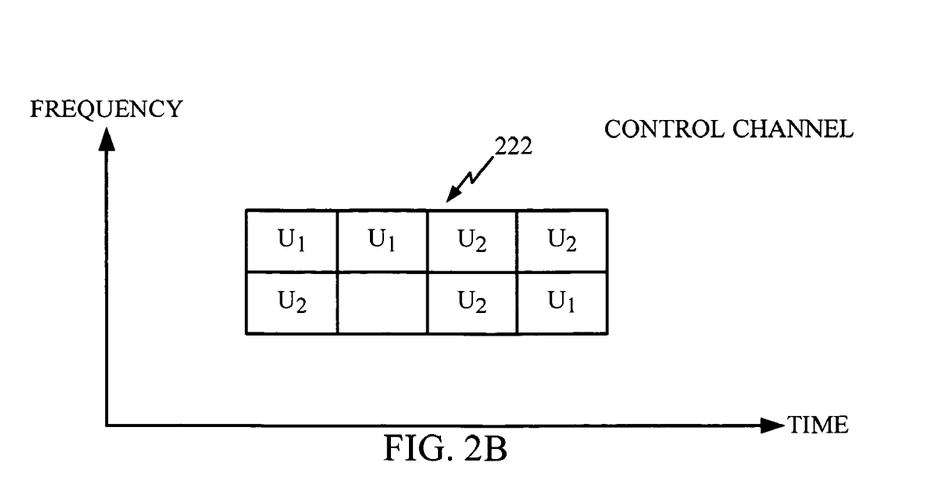
FIG. 2B shows an alternative embodiment for assigning multiple users on the same control channel in a communication network.

In a second embodiment for a control-channel assignment, as shown in FIG. 2B, a hop region 222 is disjointly assigned to two or more users, e.g., U1 and U2. Each user is assigned to one or more unique modulation symbol(s) and may transmit control information on some or all of its assigned modulation symbols within the hop region for a control channel. In one embodiment, users assigned to a hop region may not overlap on the same modulation symbol in the assigned hop region.

In a third embodiment, a combination of the first and second embodiments described above may be used. In the above embodiments, one or more pilot symbol embedded within the control channel, which are used for demodulating the control channel, may be used for reverse-link timing control loop.

For some control channels, e.g., ACK/NACK, where there may be only 1 bit of information, one may use binary phase shift keying (BPSK) or on-off keying (OOK) demodulation techniques. On-off keying may have advantages in case of false forward-link channel assignments, in which case the NACKs of the incorrectly assigned user do not interfere with transmissions of the legitimate owner of the channel. For the ACK/NACK channel, a means of reducing the probability of mistaking NACK for ACK, or vice versa, may be required. An ACK mistaken as a NACK results in an unnecessary retransmission of the packet, whereas a NACK mistaken as an ACK may result in not retransmitting an unreceived packet, causing a packet error. This may be done in BPSK using a biased decision threshold, and in on-off keying by appropriate setting of the decision threshold. For on-off keying, an absolute threshold setting or one based on the long term average interference variance may result in performance being sensitive to interference variations. According to one embodiment, some of the Walsh codes may be reserved, or unallocated to any user, and may be used to obtain an estimate of the interference variance over a hop region. The on-off decision threshold may be set based on this estimate of the current interference variance. If the system is lightly loaded, all the extra unused Walsh codes may be utilized towards the interference measurement. In one embodiment, the AP measures the received power of the reserved Walsh code(s), or the Walsh code(s) un-assigned to any user, and uses such codes in estimating the current interference power on the reverse link. The AP may use the current interference power on the reverse link to set a threshold for on/off keying demodulation of control channels, such as ACK/NAK (1-bit control channel.

The frequency hopping system may have multiple hop regions in a frame, and frames may be grouped into multiple interlaces of frames disjoint in time. Simultaneous transmissions on independently hopping sub-carrier groups (i.e., multiple data channels) from the same user tends to increase out-of-band emissions due to power amplifier's (PA) non-linearity, which may necessitate higher PA backoffs that translate to link budget reduction. In one embodiment, disjoint set of hop regions within a frame may be assigned to different control channels, e.g., REQ/CQI and ACK/NACK control channels, so that these control channels may not be transmitted simultaneously. In one embodiment, each data channel will be scheduled on one interlace. In one embodiment, the user's control channel hops may be scheduled on a different interlace from the data channel interlace assigned to the same user.

Figure 3:
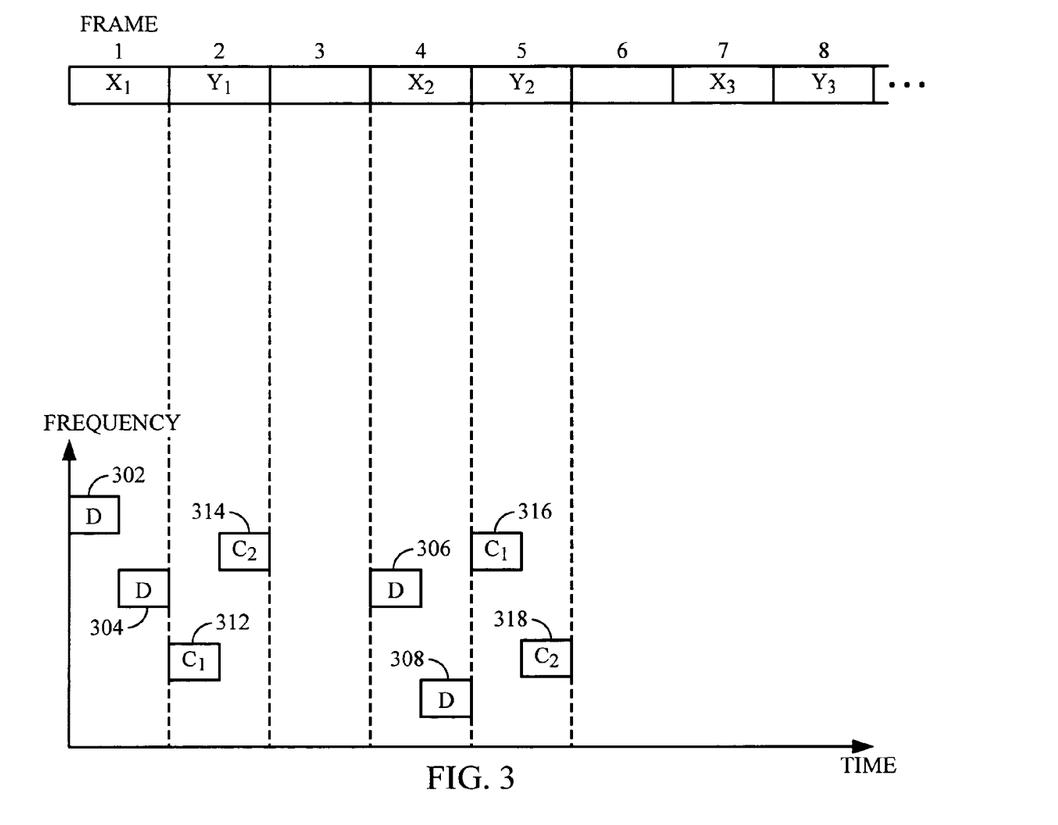
FIG. 3 shows one embodiment for data and control channels assignment in a communication network.

FIG. 3 shows one embodiment for communicating data and control information in interlaced frames, e.g., in an FH-OFDMA wireless communication network. The FH-OFDMA system may have multiple hop regions in a frame, and a number of specific disjoint frames of information on a channel may be grouped into a frame interlace. For example, in FIG. 3, frames 1, 4, and 7 are grouped into a first frame interlace {x1, x2, x3, . . . }, and frames 2, 5, and 8 are grouped into a second frame interlace {y1, y2, y3, . . . }.

In one embodiment, data channel information may be communicated by at least one frame of a first frame interlace, and the control channel information may be communicated by at least one frame of a second fame interlace. For example, in FIG. 3, data is communicated by two hop regions 302, 304 in the first frame x1, and two hop regions 306, 308 in the second frame x2, belonging to the first frame interlace.

Similarly, control information is communicated by two hop regions 312, 314 in the first frame y1, and two hop regions 316, 318 in the second frame y2, belonging to the second frame interlace. The first frame interlace and the second frame interlace may have different or same formats and/or structures.

In one embodiment, control information on a first control channel may be communicated by at least one hop region in a frame of an interlace, and the control channel information on a second control channel may be communicated by at least one different or disjoint hop region in the same frame of the interlace. For example, in FIG. 3, control information of a first control channel C1, e.g., ACK/NACK, is communicated by hop region 312 in the first frame y1, and control information of a second control channel C2, e.g., REQ/CQI, is communicated by hop region 314 in the first frame y1.

There may be situations where a user needs more control channel resources than provided by a single control channel. For example, MIMO users may need more bits for CQI since the channel is described by a matrix rather than a scalar. Similarly, more bits may be needed for ACK/NACK control channel for a MIMO user, since in the MIMO case, a separate ACK/NACK may be needed for each layer of MIMO transmission. In one embodiment, multiple control channels, e.g., on different interlaces, may be assigned to the same user.

Figure 4:
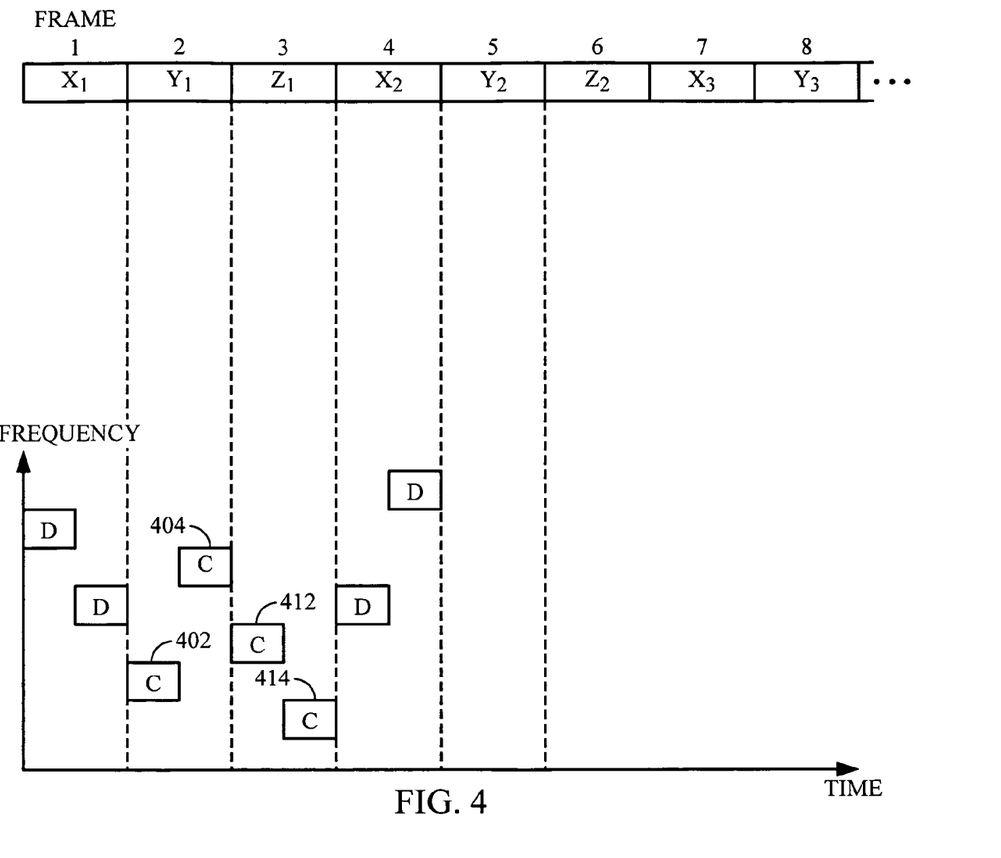
FIG. 4 shows another embodiment for data and control channels assignment in a communication network.

For example, as in FIG. 4, at least two frame interlaces {y1, y2, y3, . . . } and {z1, z2, z3, . . . } of control channel are assigned to the same user, whose data channel may have been assigned to frame interlace {x1, x2, x3, . . . }. Here, hop regions 402 and 404 in frame y1 and hop regions 412 and 414 in frame z1 are assigned to one or more control channels for the same user. As discussed above, if more than one control channel were assigned to the same frame, the control channels may each be assigned to a different hop region of the same frame, e.g., hop regions 402/412 and 404/414 may carry different control channels. In this example, a first control channel, e.g., ACK/NACK, is carried on hop regions 404 and 414, and a second control channel e.g., REQ/CQI, is carried on hop regions 402 and 412.

In the embodiments discussed above for assigning data and control channels to unique hop regions in specific frames, and/or interlaces, such time and/or frequency assignments may be communicated to an AP/AT. In one embodiment, the AP/AT may send separate messages for data channel and control channel assignments, which generally increase air-interface overheads. Alternatively, the control channel assignment is made dependent on the data channel assignment, thus; reducing the number of messages.

In one embodiment, the allocation of the control channels, i.e., the Walsh code and the time-frequency grid positions that the access terminal may use for uplink control transmissions, may be made implicit in the downlink transmission(s) to avoid having to signal multiple messages over the air-interface. In one embodiment, a first, e.g., REQ/CQI, control channel allocation is determined based on the user's MAC-ID, and a second control channel, e.g., ACK/NACK, allocation is based on the user's MAC-ID and/or the channel-ID of the forward-link channel which is being acknowledged.

In one embodiment, a unique identification code, e.g., MAC-ID is assigned to each access terminal (AT), and time, frequency and code assignment for a RL control channel, e.g., REQ/CQI, may correspond to the unique identification code, e.g. MAC-ID. In one embodiment, the unique identification code's association with the corresponding RL control channel assignment is maintained in a database, in the form of a table, e.g., at the AT. For example, knowing an AT's MAC-ID, the corresponding assigned hop regions for the REQ/CQI control channel may be found from a table.

In one embodiment, information about a data channel, e.g., channel-ID, and/or the information on a FL data channel directed to an AT, may correspond to the specific hop regions that the RL control channel may be communicated on. For example, a forward-link data channel assignment message may correspond to specific hop regions assigned to a control channel e.g., ACK/NACK, in a table maintained in a database at the AT.

The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

Figure 5:
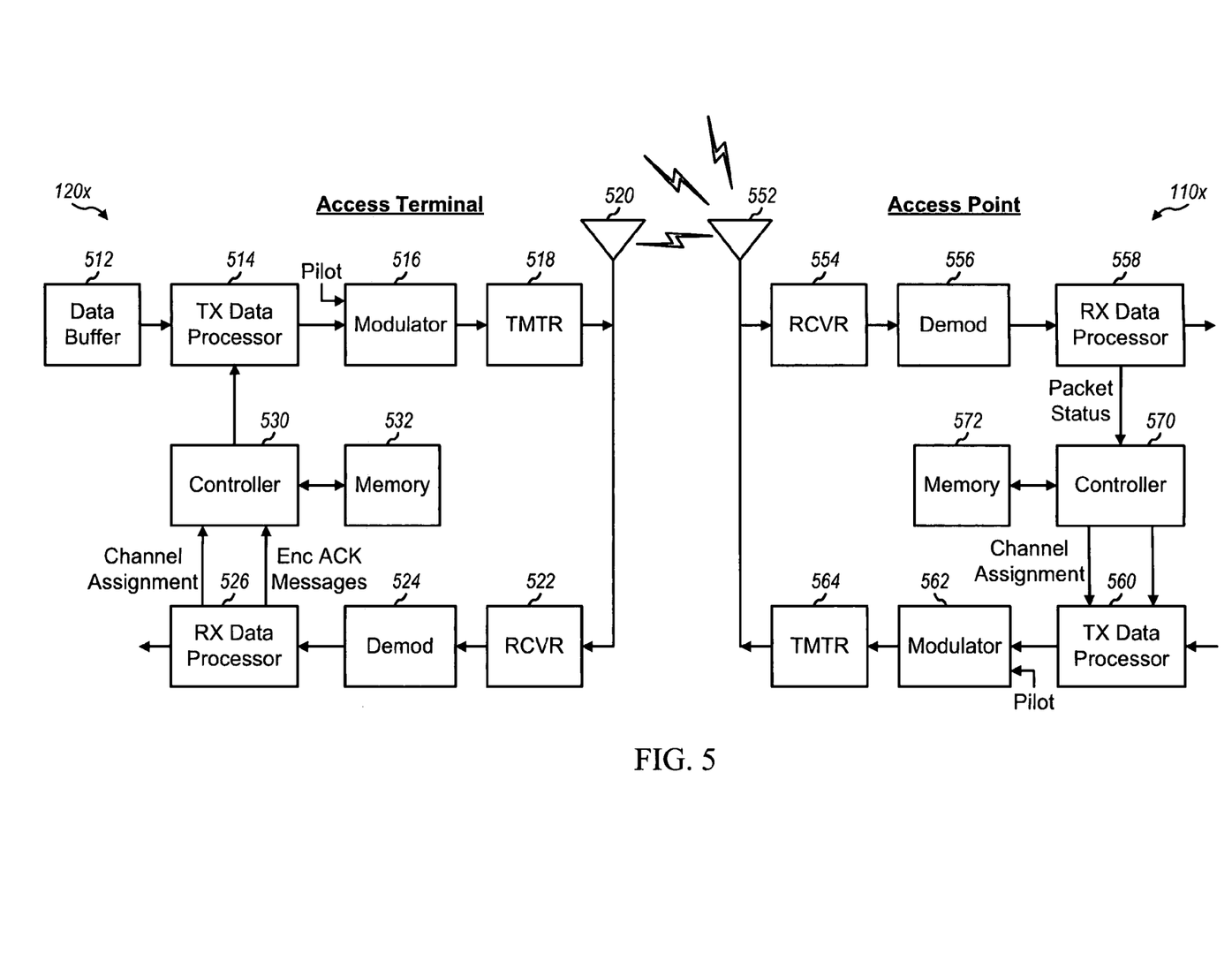
FIG. 5 shows a block diagram of an access point and an access terminal.

FIG. 5 shows a block diagram of an access point 110x and an access terminal 120x, for implementing the disclosed embodiments as discussed above in connection with FIG. 1 through FIG. 4. For the reverse link, at terminal 120x, a transmit (TX) data processor 514 receives traffic data from a data buffer 512, processes (e.g., encodes, interleaves, and symbol maps) each data packet based on a selected coding and modulation scheme, and provides data symbols. A data symbol is a modulation symbol for data, and a pilot symbol is a modulation symbol for pilot (which is known a priori). A modulator 516 receives the data symbols, pilot symbols, and possibly signaling for the reverse link, performs (OFDM) modulation and/or other processing as specified by the system, and provides a stream of output chips. A transmitter unit (TMTR) 518 processes (e.g., converts to analog, filters, amplifies, and frequency upconverts) the output chip stream and generates a modulated signal, which is transmitted from an antenna 520.

At access point (AP) 110x, the modulated signals transmitted by terminal 120x and other terminals in communication with access point 110x are received by an antenna 552. A receiver unit (RCVR) 554 processes (e.g., conditions and digitizes) the received signal from antenna 552 and provides received samples. A demodulator (Demod) 556 processes (e.g., demodulates and detects) the received samples and provides detected data symbols, which are noisy estimate of the data symbols transmitted by the terminals to AP 110x. A receive (RX) data processor 558 processes (e.g., symbol demaps, deinterleaves, and decodes) the detected data symbols for each terminal and provides decoded data for that terminal.

For the forward link, at AP 11x, traffic data is processed by a TX data processor 560 to generate data symbols. A modulator 562 receives the data symbols, pilot symbols, and signaling for the forward link, performs (OFDM) modulation and/or other pertinent processing, and provides an output chip stream, which is further conditioned by a transmitter unit 564 and transmitted from antenna 552. The forward-link signaling may include power control commands generated by a controller 570 for all terminals transmitting on the reverse link to AP 110x. At terminal 120x, the modulated signal transmitted by AP 110x is received by antenna 520, conditioned and digitized by a receiver unit 522, and processed by a demodulator 524 to obtain detected data symbols. An RX data processor 526 processes the detected data symbols and provides decoded data for the terminal and the forward-link signaling. Controller 530 receives the power control commands, and controls data transmission and transmit power on the reverse link to AP 110x. Controllers 530 and 570 direct the operation of terminal 120x and access point 110x, respectively. Memory units 532 and 572 store program codes and data used by controllers 530 and 570, respectively, for implementing the disclosed control channel allocation techniques.

The signaling transmission techniques described herein may be implemented by various means. For example, these techniques may be implemented in hardware, software, or a combination thereof. For a hardware implementation, the processing units used to process (e.g., compress and encode) signaling may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to decode and decompress the signaling may also be implemented with one or more ASICs, DSPs, and so on.

For a software implementation, the signaling transmission techniques may be implemented with modules (e.g., procedures, functions, and so on) that perform the functions described herein. The software codes may be stored in a memory unit (e.g., memory unit 532 or 572 in FIG. 5) and executed by a processor (e.g., controller 530 or 570). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for allocating a plurality of users on a control channel in a wireless communication network that employs a frequency hopping scheme, the method comprising:

assigning a first number of modulation symbols to a hop region for a control channel;

allocating a second number of users to the first number of modulation symbols assigned to the hop region of the control; and enabling the second number of users to transmit control data on each modulation symbol assigned to the hop region of the control channel to provide uniform interference to other sectors over the hop region.

2. The method of claim 1, wherein said allocating further comprises allocating a plurality of the second number of users to at least one of the first number of modulation symbols.

3. The method of claim 2, wherein each of the plurality of the second number of users assigned to the same modulation symbol is assigned a unique Walsh code.

4. The method of claim 1, wherein said allocating further comprises allocating each one of the second number of users to at least one of the first number of modulation symbols such that no two users overlap in any one of the first number of modulation symbols.

5. The method of claim 1, wherein at least one pilot embedded within the control channel is used for controlling reverse-link timing.

6. The method of claim 1, wherein the wireless communication network further comprises an FH-OFDMA (frequency hopping Orthogonal Frequency-Division Multiple Access) air-interface.

7. A method for communicating data and control channel information in a wireless communication network employing frequency hopping, the method comprising:

assigning disjoint set of hop regions within a frame for different control channels such that the control channels are not transmitted simultaneously, control information on a first control channel communicated by at least one hop region in a frame of an interlace, and control channel information on a second control channel communicated by at least one disjoint hop region in the same frame of the interlace;

communicating data channel information assigned to a user by at least one frame of a first frame interlace; and communicating control channel information assigned to the user by at least one frame of a second frame interlace.

8. The method of claim 7, wherein the first frame interlace and the second frame interlace have the same format.

9. The method of claim 7, wherein the wireless communication network further comprises an OFDMA air-interface.

10. A method for communicating control channel information in a wireless communication network employing frequency hopping, the method comprising grouping specific disjoint frames of hop regions on a control channel into at least two frame interlaces; and communicating a plurality of control channels by a plurality of disjoint hop regions within a frame of an interlace such that control information on a first control channel communicated by at least one region in a frame of an interlace, and control channel information on a second control channel communicated by at least one disjoint hop region in the same frame of the interlace.

11. The method of claim 10, wherein the plurality of control channels further comprises ACK/NACK and REQ/CQI.

12. The method of claim 10, wherein the wireless communication network further comprises an OFDMA air-interface.

13. A method for allocating reverse-link (RL) control channel for an access terminal in a wireless communication network employing frequency hopping, the method comprising:

assigning a unique identification code to an access terminal (AT); and allocating at least one hop region corresponding to the unique identification code to a plurality of RL control channels for use by the AT, control information on a first RL control channel communicated by at least one hop region in a frame of an interlace, and control channel information on a second RL control channel communicated by at least one disjoint hop region in the same frame of the interlace.

14. The method of claim 13, wherein the unique identification code further comprises MAC-ID and the RL control channel further comprises REQ/CQI.

15. The method of claim 13, wherein the unique identification code further comprises MAC-ID and the RL control channel further comprises ACK/NACK.

16. The method of claim 13, wherein an association of the unique identification code with the corresponding RL control channel assignment is maintained in a database.

17. A method for allocating RL control channel for an access terminal in a wireless communication network employing frequency hopping, the method comprising:

assigning a forward link to an access terminal (AT); and allocating at least one hop region, corresponding to the assigned forward link, to a plurality of RL control channel for use by the AT, control information on a first RL control channel communicated by at least one hop region in a frame of an interlace, and control channel information on a second RL control channel communicated by at least one disjoint hop region in the same frame in the interlace.

18. The method of claim 17, wherein the forward link carries a channel ID and the RL control channel further comprises an ACK/NACK control channel associated with the forward-link channel ID.

19. The method of claim 17, wherein an association of the assigned forward link with the corresponding RL control channel assignment is maintained in a database.

20. A method for communicating data and control channel information in a wireless communication network employing frequency hopping, the method comprising:

grouping specific disjoint frames of hop regions on a control channel in a plurality of frame interlaces;

communicating data channel information for a user by at least one frame interlace; and communicating control channel information for the user by at least two frame interlaces such that the control channels are not transmitted simultaneously, control information on a first control channel communicated by at least one hop region in a frame of an interlace, and control channel information on a second control channel communicated by at least one disjoint hop region in the same frame of the interlace.

21. The method of claim 20, wherein the two frame interlaces are contiguous.

22. The method of claim 20, wherein the user is a MIMO user.

23. The method of claim 20, wherein the wireless communication network further comprises an OFDMA air-interface.

24. A method for demodulating a control channel in a wireless communication network employing frequency hopping, the method comprising:

determining received power for at least one code, the at least one code assigned to a user transmitting control information on a first control channel by at least one hop region in a frame of an interlace, and control channel information on a second control channel by at least one disjoint hop region in the same frame of the interlace; and demodulating the control channel based on the determined received power for the received code.

25. The method of claim 24, wherein the code further comprises a unique Walsh code reserved for determining interference power.

26. The method of claim 24, wherein the code further comprises any Walsh code that is unused for information transmission.

27. The method of claim 24, wherein the control channel further comprises an ACK/NACK channel.

28. The method of claim 24, wherein the wireless communication network further comprises an OFDMA air-interface.

29. A non-transitory computer-readable medium carrying means for implementing a method for allocating a plurality of users on a control channel in a wireless communication network by employing frequency hopping, the method comprising:
   assigning a first number of modulation symbols to a hop region for a control channel;
   allocating a second number of users to the first number of modulation symbols to the hop region of the control channel; and
   enabling the second number of users to transmit control data on each modulation symbol assigned to the hop region of the control channel to provide uniform interference to other sectors over the hop region.

30. The medium of claim 29, wherein said allocating further comprises allocating a plurality of the second number of users to at least one of the first number of modulation symbols.

31. The medium of claim 30, wherein each of the plurality of the second number of users assigned to the same modulation symbol is assigned a unique Walsh code.

32. The medium of claim 29, wherein said allocating further comprises allocating each one of the second number of users to at least one of the first number of modulation symbols such that no two users overlap in any one of the first number of modulation symbols.

33. The medium of claim 29, wherein at least one pilot embedded within the control channel is used for controlling reverse-link timing.

34. The medium of claim 29, wherein the wireless communication network further comprises an OFDMA air-interface.

35. A non-transitory computer-readable medium carrying means for implementing a method for communicating data and control channel information in a wireless communication network by employing a frequency hopping scheme, the method comprising:
   assigning disjoint set of hop regions within a frame to different control channels such that the control channels are not transmitted simultaneously, control information on a first control channel communicated by at least one hop region in a frame of an interlace, and control channel information on a second control channel communicated by at least one disjoint hop region in the same frame of the interlace;
   communicating data channel information assigned to a user by at least one frame of a first frame interlace; and
   communicating control channel information assigned to the user by at one frame of a second frame interlace.

36. The medium of claim 35, wherein the first frame interlace and the second frame interlace have the same format.

37. The medium of claim 35, wherein the wireless communication network further comprises an OFDMA air-interface.

38. A non-transitory computer-readable medium carrying means for implementing a method for communicating control channel information in a wireless communication network by employing a frequency hopping scheme, the method comprising:
   grouping specific disjoint frames of hop regions on a control channel into at least two frame interlaces; and
   communicating a plurality of control channels by a plurality of disjoint hop regions within a frame of a interlace such that control information on a first control channel communicated by at least one hop region in a frame of an interlace, and control channel information on a second control channel communicated by at least one disjoint hop region in the same frame of the interlace.

39. The medium of claim 38, wherein the plurality of control channels further comprises ACK/NACK and REQ/CQI.

40. The medium of claim 38, wherein the wireless communication network further comprises an OFDMA air-interface.

41. A non-transitory computer-readable medium carrying means for implementing a method for allocating reverse-link (RL) control channel for an access terminal in a wireless communication network by employing a frequency hopping scheme, the method comprising:
   assigning a unique identification code to an access terminal (AT); and
   allocating at least one hop region corresponding to the unique identification code to a plurality of RL control channels for use by the AT, control information on a first RL control channel communicated by at least one hop region in a frame of an interlace, and control channel information on a second RL control channel communicated by at least one disjoint hop region in the same frame of the interlace.

42. The medium of claim 41, wherein the unique identification code further comprises MAC-ID and the RL control channel further comprises REQ/CQI.

43. The medium of claim 41, wherein the unique identification code further comprises MAC-ID and the RL control channel further comprises ACK/NACK.

44. The medium of claim 41, wherein an association of the unique identification code with the corresponding RL control channel assignment is maintained in a database.

45. A non-transitory computer-readable medium carrying means for implementing a method for allocating RL control channel for an access terminal in a wireless communication network by employing a frequency hopping scheme, the method comprising:
   assigning a forward link to an access terminal (AT); and
   allocating at least one hop region, corresponding to the assigned forward link, to a plurality of RL control channels for use by the AT, control information on a first RL control channel communicated by at least one hop region in a frame of an interlace, and control channel information on a second RL control channel communicated by at least one disjoint hop region in the same frame of the interlace.

46. The medium of claim 45, wherein the forward link carries a channel ID and the RL control channel further comprises an ACK/NACK control channel associated with the forward-link channel ID.

47. The medium of claim 45, wherein an association of the assigned forward link with the corresponding RL control channel assignment is maintained in a database.

48. A non-transitory computer-readable medium carrying means for implementing a for communicating data and control channel information in a wireless communication network, employing frequency hopping, the method comprising:

grouping specific disjoint frames of hop regions on a control channel in a plurality of frame interlaces;
communicating data channel information for a user by at least one frame interlace; and
communicating control channel information for the user by at least two frame interlaces such that the control channels are not transmitted simultaneously, control information on a first control channel communicated by at least one hop region in a frame of an interlace, and control channel information on a second control channel communicated by at least one disjoint hop region in the same frame of the interlace.

49. The medium of claim 48, wherein the two frame interlaces are contiguous.

50. The medium of claim 48, wherein the user is a MIMO user.

51. The medium of claim 48, wherein the wireless communication network further comprises an OFDMA air-interface.

52. A non-transitory computer-readable medium carrying means for implementing a method for demodulating a control channel in a wireless communication network employing frequency hopping, the method comprising:
determining received power for at least one code, the at least one code assigned to a user transmitting control information on a first control channel by at least one hop region in a frame of an interlace, and control channel information on a second control channel by at least one disjoint hop region in the same frame of the interlace; and
demodulating the control channel based on the determined received power for the received code.

53. The medium of claim 52, wherein the code further comprises a unique Walsh code reserved for determining interference power.

54. The medium of claim 52, wherein the code further comprises any Walsh code that is unused for information transmission.

55. The medium of claim 52, wherein the control channel further comprises an ACK/NACK channel.

56. The medium of claim 52, wherein the wireless communication network further comprises an OFDMA air-interface.

57. An apparatus for allocating a plurality of users on a control channel in a wireless communication network that employs a frequency hopping scheme, comprising:
means for assigning a first number of modulation symbols to a hop region for a control channel;
means for allocating a second number of users to the first number of modulation symbols assigned to the hop region of the control channel; and
means for enabling the second number of users to transmit control data on each modulation symbol assigned to the hop region of the control channel to provide uniform interference to other sectors over the hop region.

58. The apparatus of claim 57, wherein said means for allocating further comprises means for allocating a plurality of the second number of users to at least one of the first number of modulation symbols.

59. The apparatus of claim 58, wherein each of the plurality of the second number of users assigned to the same modulation symbol is assigned a unique Walsh code.

60. The apparatus of claim 57, wherein said means for allocating further comprises means for allocating each one of the second number of users to at least one of the first number of modulation symbols such that no two users overlap in any one of the first number of modulation symbols.

61. The apparatus of claim 57, wherein at least one pilot embedded within the control channel is used for controlling reverse-link timing.

62. The apparatus of claim 57, wherein the wireless communication network further comprises an OFDMA air-interface.

63. An apparatus for communicating data and control channel information in a wireless communication network, comprising:
means for assigning disjoint set of hop regions within a frame to different control channels such that the control channels are not transmitted simultaneously, control information on a first control channel communicated by at least one hop region in a frame of an interlace, and control channel information on a second control channel communicated by at least one disjoint hop region in the same frame of the interlace;
means for communicating data channel information assigned to a user by at least one frame of a first frame interlaces; and
means for communicating control channel information assigned to the user by at least one frame of a second frame interlace.

64. The apparatus of claim 63, wherein the first frame interlace and the second frame interlace have the same format.

65. The apparatus of claim 63, wherein the wireless communication network further comprises an OFDMA air-interface.

66. An apparatus for communicating control channel information in a wireless communication network by employing a frequency hopping scheme, comprising:
means for grouping specific disjoint frames of hop regions on a control channel into at least two frame interlaces; and
means for communicating a plurality of control channels by a plurality of disjoint hop regions within a frame of an interlace such that control information on a first control channel communicated by at least one hop region in a frame of an interlace, and control channel information on a second control channel communicated by at least one disjoint hop region in the same frame of the interlace.

67. The apparatus of claim 66, wherein the plurality of control channels further comprises ACK/NACK and REQ/CQI.

68. The apparatus of claim 66, wherein the wireless communication network further comprises an OFDMA air-interface.

69. An apparatus for allocating reverse-link (RL) control channel for an access terminal in a wireless communication network that employs a frequency hopping scheme, comprising:
means for assigning a unique identification code to an access terminal (AT); and
means for allocating at least one hop region corresponding to the unique identification code to a plurality of RL control channels for use by the AT, control information on a first RL control channel communicated by at least one hop region in a frame of an interlace, and control channel information on a second RL control channel communicated by at least one disjoint hop region in the same frame of the interlace.

70. The apparatus of claim 69, wherein the unique identification code further comprises MAC-ID and the RL control channel further comprises REQ/CQI.

71. The apparatus of claim 69, wherein the unique identification code further comprises MAC-ID and the RL control channel further comprises ACK/NACK.

72. The apparatus of claim 69, wherein an association of the unique identification code with the corresponding RL control channel assignment is maintained in a database.

73. An apparatus for allocating RL control channel for an access terminal in a wireless communication network that employs a frequency hopping scheme, the method comprising:
means for assigning a forward link to an access terminal (AT); and
means for allocating at least one hop region, corresponding to the assigned forward link, to a plurality of RL control channels for use by the AT, control information on a first RL control channel communicated by at least one hop region in a frame of an interlace, and control channel information on a second RL control channel communicated by at least one disjoint hop region in the same frame of the interlace.

74. The apparatus of claim 73, wherein the forward link carries a channel ID and the RL control channel further comprises an ACK/NACK control channel associated with the forward-link channel ID.

75. The apparatus of claim 73, wherein an association of the assigned forward link with the corresponding RL control channel assignment is maintained in a database.

76. An apparatus for communicating data and control channel information in a wireless communication network, comprising:
means for grouping specific disjoint frames of hop regions on a control channel in a plurality of frame interlaces;
means for communicating data channel information for a user by at least one frame interlace; and
means for communicating control channel information for the user by at least two frame interlaces such that the control channels are not transmitted simultaneously, control information on a first control channel communicated by at least one hop region in a frame of an interlace, and control channel information on a second control channel communicated by at least one disjoint hop region in the same frame of the interlace.

77. The apparatus of claim 76, wherein the two frame interlaces are contiguous.

78. The apparatus of claim 76, wherein the user is a MIMO user.

79. The apparatus of claim 76, wherein the wireless communication network further comprises an OFDMA air-interface.

80. An apparatus for demodulating a control channel in a wireless communication network that employs a frequency hopping scheme, comprising:
means for determining received power for at least one code, the at least one code assigned to a user transmitting control information on a first control channel by at least one hop region in a frame of an interlace, and control channel information on a second control channel by at least one disjoint hop region in the same frame of the interlace; and
means for demodulating the control channel based on the determined received power for the received code.

81. The apparatus of claim 80, wherein the code further comprises a unique Walsh code reserved for determining interference power.

82. The apparatus of claim 80, wherein the code further comprises any Walsh code that is unused for information transmission.

83. The apparatus of claim 80, wherein the control channel further comprises an ACK/NACK channel.

84. The apparatus of claim 80, wherein the wireless communication network further comprises an OFDMA air-interface.

85. A processor programmed to execute a method for allocating a plurality of users on a control channel in a wireless communication network that employs a frequency hopping scheme, the method comprising:
assigning a first number of modulation symbols to a hop region for a control channel;
allocating a second number of users to the first number of modulation symbols assigned to the hop region of the control channel; and
enabling the second number of users to transmit control data on each modulation symbol assigned to the hop region of the control channel to provide uniform interference to other sectors over the hop region.

86. A processor programmed to execute a method for communicating data and control channel information in a wireless communication network by employing a frequency hopping scheme, the method comprising:
assigning disjoint set of hop regions within a frame to different control channels such that the control channels are not transmitted simultaneously, control information on a first control channel communicated by at least one hop region in a frame of an interlace, and control channel information on a second control channel communicated by at least one disjoint hop region in the same frame of the interlace;
communicating data channel information assigned to a user by at least one frame of a first frame interlace; and
communicating control channel information assigned to the user by at least one frame of a second frame interlace.

87. A processor programmed to execute a method for communicating control channel information in a wireless communication network by employing a frequency hopping scheme, the method comprising:
grouping specific disjoint frames of hop regions on a control channel into at least two frame interlaces; and
communicating a plurality of control channels assigned to a user by a plurality of disjoint hop regions within a frame of a interlace such that control information on a first control channel communicated by at least one hop region in a frame of an interlace, and control channel information on a second control channel communicated by at least one disjoint hop region in the same frame of the interlace.

88. A processor programmed to execute a method for allocating reverse-link (RL) control channel for an access terminal in a wireless communication network by employing a frequency hopping scheme, the method comprising:
assigning a unique identification code to an access terminal (AT); and
allocating at least one hop region corresponding to the unique identification code to a plurality of RL control channels for use by the AT, control information on a first RL control channel communicated by at least one hop region in a frame of an interlace, and control channel information on a second RL control channel communicated by at least one disjoint hop region in the same frame in the interlace.

89. A processor programmed to execute a method for allocating RL control channel for an access terminal in a wireless communication network by employing a frequency hopping scheme, the method comprising:
assigning a forward link to an access terminal (AT); and allocating at least one hop region, corresponding to the assigned forward link, to a plurality RL control channel for use by the AT, control information on a first RL control channel communicated by at least one hop region in a frame of an interlace, and control channel information on a second RL control channel communicated by at least one disjoint hop region in the same frame of the interlace.

90. A processor programmed to execute a method for communicating data and control channel information in a wireless communication network by employing a frequency hopping scheme, the method comprising:

grouping specific disjoint frames of hop regions on a control channel in a plurality of frame interlaces;

communicating data channel information for a user by at least one frame interlace; and communicating control channel information for the user by at least two frame interlaces such that the control channels are not transmitted simultaneously, control information on a first control channel communicated by at least one hop region in a frame of an interlace, and control channel information on a second control channel communicated by at least one disjoint hop region in the same frame of the interlace.

91. A processor programmed to execute a method for demodulating a control channel in a wireless communication network by employing a frequency hopping scheme, the method comprising:

determining received power for at least one code, the at least one code assigned to a user transmitting control information on a first control channel by at least one hop region in a frame of an interlace, and control channel information on a second control channel by at least one disjoint hop region in the same frame of the interlace; and demodulating the control channel based on the determined received power for the received code.

* * * * *